United States Patent
Planck

(10) Patent No.: US 8,252,441 B2
(45) Date of Patent: Aug. 28, 2012

(54) SPACERS FOR FIXING BATTERY CELLS WITHIN A BATTERY PACKAGE CASING AND ASSOCIATED SYSTEMS AND METHODS

(75) Inventor: William A. Planck, Beaverton, OR (US)

(73) Assignee: Micro Power Electronics, Inc., Beaverton, OR (US)

( * ) Notice: Subject to any disclaimer, the term of this patent is extended or adjusted under 35 U.S.C. 154(b) by 790 days.

(21) Appl. No.: 12/201,636

(22) Filed: Aug. 29, 2008

(65) Prior Publication Data
US 2009/0061301 A1  Mar. 5, 2009

Related U.S. Application Data

(60) Provisional application No. 60/969,259, filed on Aug. 31, 2007.

(51) Int. Cl.
*H01M 12/00* (2006.01)
*H01M 2/10* (2006.01)
*H01M 6/42* (2006.01)
*H01M 2/00* (2006.01)

(52) U.S. Cl. ............ 429/96; 429/9; 429/99; 429/100; 429/160; 429/163

(58) Field of Classification Search ............ 429/96–100
See application file for complete search history.

(56) References Cited

U.S. PATENT DOCUMENTS

| | | |
|---|---|---|
| 5,384,212 A | 1/1995 | Heiman et al. |
| 5,395,263 A | 3/1995 | Sandell |
| 5,631,098 A | 5/1997 | Suzuki |
| 5,756,229 A | 5/1998 | Pyszczek et al. |
| 5,853,912 A | 12/1998 | Naing et al. |
| 5,977,746 A | 11/1999 | Hershberger et al. |
| 6,007,944 A | 12/1999 | Bechtold et al. |
| 6,045,949 A | 4/2000 | Kuipers et al. |
| 6,063,518 A | 5/2000 | Dewulf et al. |

(Continued)

FOREIGN PATENT DOCUMENTS

DE    10134145    2/2003

(Continued)

OTHER PUBLICATIONS

U.S. Appl. No. 11/420,708, May 26, 2006, Guzman.

(Continued)

*Primary Examiner* — Patrick Ryan
*Assistant Examiner* — Julian Anthony
(74) *Attorney, Agent, or Firm* — Perkins Coie LLP; Michael F. Scalise

(57) ABSTRACT

A battery support system for supporting at least one battery cell disposed within a battery package is described herein. In one embodiment, the battery support system includes a spacer element having a frame member configured to be proximate to an end of the battery cell. The frame member has first projections extending away from the frame member in a first direction. The first projections are configured to engage a portion of the side surface of the battery cell. In a particular embodiment, the frame member further has second projections extending away from the frame member in a second direction generally opposite the first direction. The second projections are configured or positioned to provide a stand-off between the end of the battery cell and an interior surface of the battery package in which the battery support system is disposed.

21 Claims, 3 Drawing Sheets

U.S. PATENT DOCUMENTS

| | | | |
|---|---|---|---|
| 6,110,618 A | 8/2000 | Vacheron et al. | |
| 6,119,864 A | 9/2000 | Kessler et al. | |
| 6,146,783 A | 11/2000 | Brohm et al. | |
| 6,190,794 B1 | 2/2001 | Wyser | |
| 6,275,372 B1 | 8/2001 | Vassallo et al. | |
| 6,399,238 B1 | 6/2002 | Oweis et al. | |
| 6,558,835 B1 | 5/2003 | Kurisu et al. | |
| 6,627,345 B1 * | 9/2003 | Zemlok et al. | 429/99 |
| 6,631,072 B1 | 10/2003 | Paul et al. | |
| 6,697,249 B2 | 2/2004 | Maletin et al. | |
| 6,733,919 B1 * | 5/2004 | Nguyen et al. | 429/99 |
| 6,741,448 B2 | 5/2004 | Mido et al. | |
| 6,899,975 B2 | 5/2005 | Watanabe et al. | |
| 6,913,852 B2 | 7/2005 | Nakanishi et al. | |
| 6,942,359 B2 * | 9/2005 | Furth et al. | 362/205 |
| 7,160,644 B2 | 1/2007 | White et al. | |
| 7,554,644 B2 | 6/2009 | Chang | |
| 7,808,772 B2 | 10/2010 | Young et al. | |
| 2005/0077873 A1 | 4/2005 | Watson et al. | |
| 2006/0091852 A1 | 5/2006 | Watson et al. | |

FOREIGN PATENT DOCUMENTS

| | | |
|---|---|---|
| EP | 1635416 | 3/2006 |
| WO | WO-2005038954 | 4/2005 |

OTHER PUBLICATIONS

Declaration of William A. Planck for U.S. Appl. No. 12/201,636, signed Mar. 4, 2009, 7 pages.

* cited by examiner

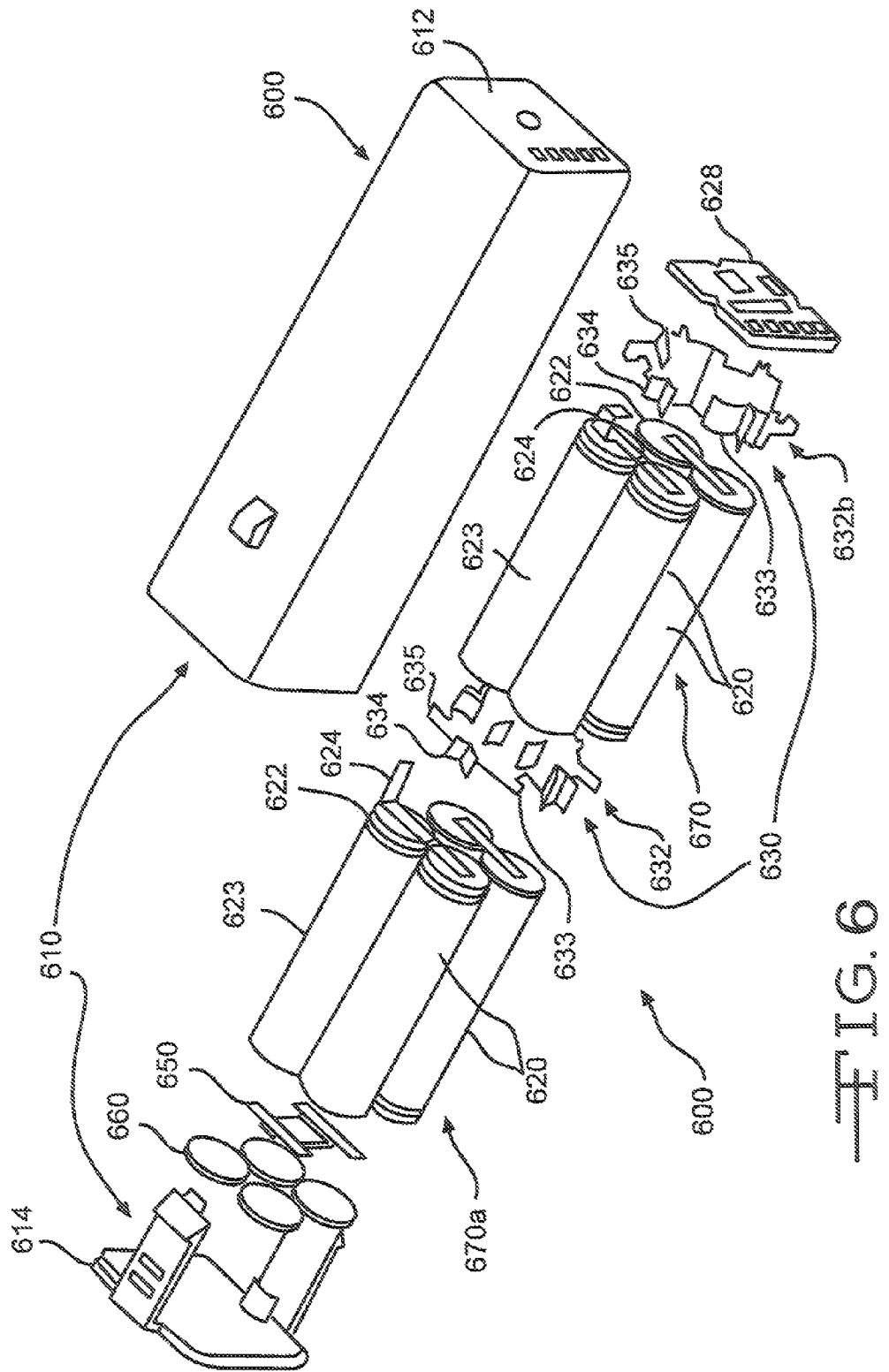

US 8,252,441 B2

SPACERS FOR FIXING BATTERY CELLS WITHIN A BATTERY PACKAGE CASING AND ASSOCIATED SYSTEMS AND METHODS

CROSS-REFERENCE TO RELATED APPLICATION

This application claims the benefit of U.S. Provisional Patent Application No. 60/969,259 filed Aug. 31, 2007, entitled "SPACERS FOR FIXING BATTERY CELLS WITHIN A BATTERY PACKAGE CASING AND ASSOCIATED SYSTEMS AND METHODS," which is incorporated herein by reference in its entirety.

TECHNICAL FIELD

The present disclosure is related to packaged battery devices and methods of manufacturing such devices.

BACKGROUND

Many portable electronic devices employ a battery package in lieu of conventional batteries or conventional battery arrangements. Existing battery packages are rechargeable and customizable, and typically include an array of rechargeable battery cells, circuitry for monitoring and regulating output power, and a casing that houses the battery cells and battery circuitry. Accordingly, battery packages can be tailored so that (a) the battery cells meet specific power requirements, (b) the package circuitry provides power feedback and control, and (c) the package casing protects the package cells and circuitry from various environmental factors. For example, battery cells for portable medical equipment (e.g., defibrillators, portable X-ray devices, and insulin pumps) are designed to meet stringent power tolerances. The package circuitries for hand-held data collection devices (e.g., barcode scanners, RFID readers, and portable printers) are configured to accommodate usage patterns, and the package casings for field instruments have contact openings that are fitted with Gore-Tex® seals to prevent moisture from entering the battery package.

Despite the foregoing advantages, battery packages are more complex than conventional batteries and can therefore be more prone to failure or diminishing performance. For example, if an individual battery cell fails, this event can cause other battery cells within the package to rapidly discharge, resulting in overheating. If the package circuitry fails, the battery package may stop functioning correctly. If the package casing becomes compromised, moisture or other types of environmental influences may affect battery package performance. Thus, to facilitate battery package operation, battery package designers need to address issues that are not common to conventional batteries and battery arrangements. Such issues are often related to the particular application for which a battery package will be used, and can contribute to significant design costs of the battery package.

BRIEF DESCRIPTION OF THE DRAWINGS

FIG. 6 is a partially exploded, isometric view of a battery package and a spacer element arrangement configured in accordance with another embodiment of the disclosure.

DETAILED DESCRIPTION

Several aspects of the present disclosure are directed to devices and methods for physically supporting battery cells within packaged battery devices, for example by using a spacer element to firmly fix the battery cells within the package casing. Well-known characteristics often associated with these types of devices and methods have not been shown or described in detail to avoid unnecessarily obscuring the description of the various embodiments. Those of ordinary skill in the relevant art will understand that additional embodiments may be practiced without several of the details described below, and that other embodiments may include aspects in addition to those described below.

Figure 1:
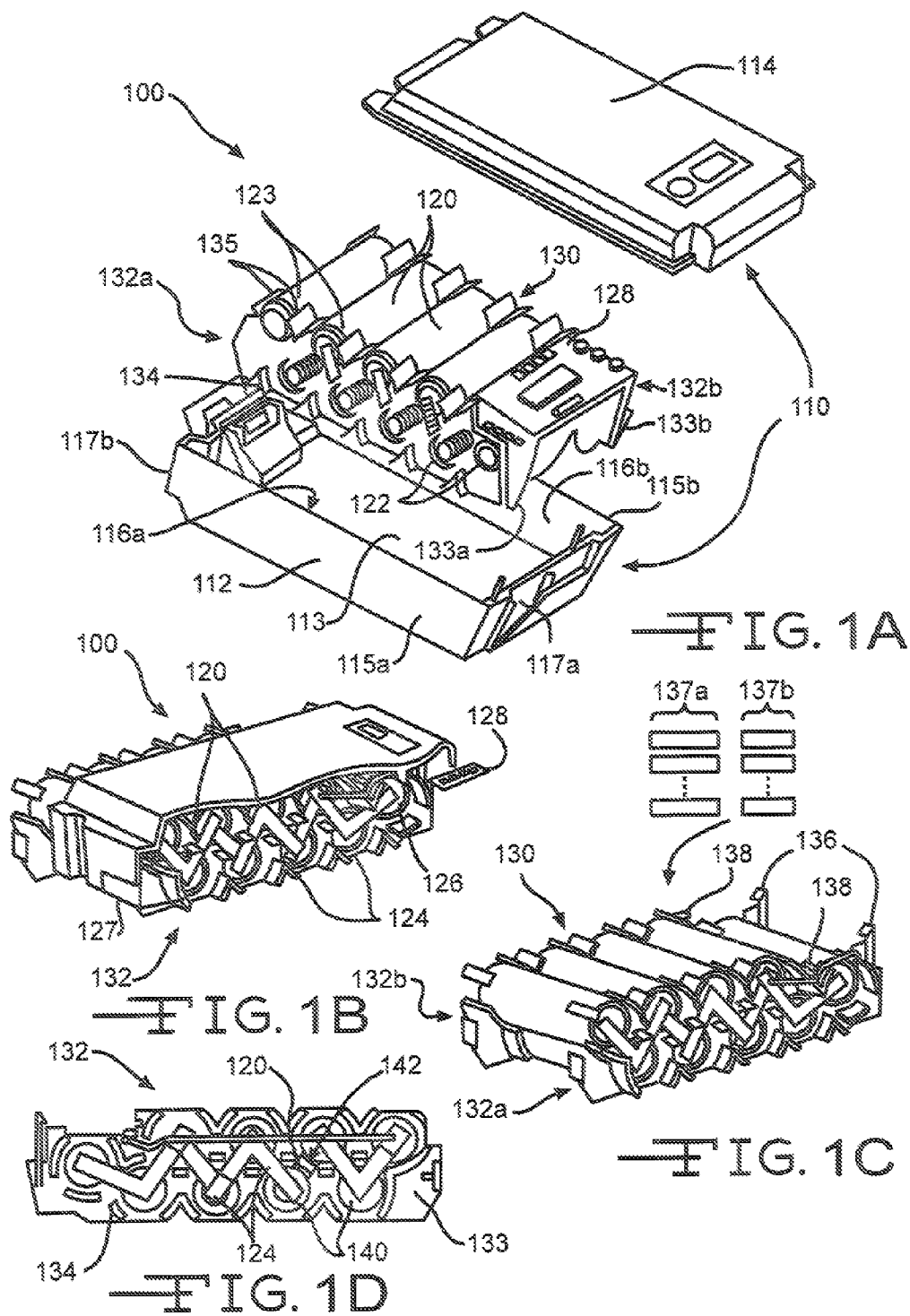
FIG. 1A is a partially exploded, isometric view of a battery package and a spacer element arrangement configured in accordance with an embodiment of the disclosure.
FIG. 1B is a partially cut-away, isometric view of the battery package shown in FIG. 1A.
FIG. 1C is an isometric view of a battery support system including a spacer element shown in FIG. 1A.
FIG. 1D is a cross-sectional side view of the spacer element shown in FIG. 1A.

FIG. 1A is a partially exploded, isometric view of a representative embodiment of a battery package 100 that can be operably coupled to a portable device. The battery package 100 can include a package casing, housing or shell 110 having a casing body 112 and a casing lid 114. The casing body 112 has a floor 113 and four sidewalls 115, 117 (shown individually as two sidewalls 115a and 115b running the length of the casing body 112 and two sidewalls 117a and 117b running the width of the casing body 112). Each of the two sidewalls 115 has an interior surface 116 (shown individually as interior surfaces 116a and 116b). The package casing 110 houses a battery support system 130 resting on the floor 113 of the casing body 112. The battery support system 130 carries or supports one or more battery cells 120. Each battery cell 120 can include a first end 122, a second oppositely facing end (not shown in FIG. 1A) spaced apart from the first end 122 and a side surface 123 between the first and second ends 122. The battery support system 130 can include one or more spacer elements 132 that carry or support the battery cells 120. The battery package 100 can also include an electrical component (as shown in FIG. 1A, a circuit board 128) that is attached to or carried by both spacer elements 132.

In the embodiment shown in FIG. 1A, the battery support system 130 includes two spacer elements 132 (shown individually as spacer elements 132a and 132b), each interposed between the battery cells 120 and one of the interior surfaces 116 of the package casing 110. Each individual spacer element 132 can include a frame member 133 (shown individually as frame members 133a and 133b) proximate to ends 122 of the battery cells 120. Each frame member 133 has first projections or support members 134 attached to or carried by the frame member 133. Each frame member 133 also has second projections or support members 135 attached to or carried by the frame member 133 and engaged with the side surfaces 123 of the battery cells 120. For example, the first projections 134 can extend in a first direction away from the frame member 133 and toward an interior surface 116 of the casing body 112. Accordingly, the first projections 134 can function as stand-offs between the frame member 133 and the neighboring interior surface 116. As another example, the second projections 135 can extend in a second (generally opposite, although not necessarily opposite) direction away from the frame 133 and the interior surface 116 to engage with the side surfaces 123 near the ends 122 of the battery cells 120. Accordingly, the second projections 135 can conformably fit around the corresponding battery cells 120. The ends 122 of the battery cells 120 can include an electrical contact (not shown in FIG. 1A) for transmitting electrical power to/from the associated battery cell 120. In addition, the ends 122 can include a vent (also not shown in FIG. 1A) for outgassing individual battery cells 120. Such a vent can equalize pressure in the event that the battery cells 120 accumulate internally produced gases.

In many embodiments, the battery support system 130 is self supporting, e.g., the spacer elements 132 can each maintain a generally fixed shape. The spacer elements 132 can also be separable from the battery cells 120, e.g., they can be readily detached from the battery cells 120 without damaging either the battery cells 120 or the spacer elements 132. In particular embodiments, each of the spacer elements 132 can be identical, which improves manufacturability and inventory management, even though each spacer element 132 may be positioned at an opposite end of the group of battery cells 120. In other embodiments, the spacer elements 132 can have different geometries (e.g., to accommodate a casing body 112 having different opposing interior surfaces 116). Battery support systems in accordance with still further embodiments can include a single unitary spacer element 132, or more than two spacer elements 132.

Battery packages may be designed to enclose certain types of battery cells (e.g., nickel-cadmium or nickel-metal-hydride cells). Relative to such types of battery cells, other types of battery cells (e.g., lithium-ion cells) can be smaller and yet provide larger amounts of power. Despite these advantages of the smaller sized battery cells, it can be prohibitively expensive to redesign existing battery packages to accommodate these smaller battery cells. In many instances, redesigning the package casing also necessitates redesigning the portable device in which it fits, so as to accommodate the smaller or otherwise differently shaped, updated battery package. In a particular embodiment, the battery support system 130 allows a battery package designed to enclose certain sizes of battery cells to be fitted or retrofitted to enclose smaller sized battery cells. Therefore, embodiments of the battery support system 130 eliminate the need to redesign the package casing 110 or the portable device that interfaces with the package casing 110. Accordingly, embodiments of the battery support system 130 may allow for the use of more advanced battery cell technologies while saving expenses associated with redesigning a carrying package casing.

Certain retrofitting techniques may include disposing a foam-type packaging or potting material to fill voids between battery cells and a package casing. Other retrofitting techniques may include gluing battery cells to each other and to one or more support elements. Although useful for partially fixing the battery cells in place within the package casing, these techniques have several drawbacks. In at least some instances, the foam material and the glue and support elements can block the flow of air through vents in the battery cells and/or through air passageways in the package casing (e.g., gaps between the casing body and the lid, gaps between the individual battery cells, gaps between the battery cells and the interior surfaces of the casing body, and other gaps or vents, such as vents at ends of battery cells). If the battery cell vents and/or the passageways in the package casing are blocked, heat can accumulate within the package casing and can present or increase a risk of fire or explosion, especially if the foam material or the glue and support elements are not made from a fire-rated or flame retardant material. Still further, the foam material and the glue and support elements may partially or completely block electrical contacts of the battery cells. Furthermore, many types of packaging and filling materials, and glue and support elements are compliant, non-uniform and non-rigid. For example, retrofitting techniques that rely on gluing battery cells to each other and to two support elements may not attach the support elements to each other, thereby reducing the ability of the arrangement to resist flexing (e.g., flexing laterally). Therefore, such packaging and filling materials, and glue and support elements may not firmly fix the battery cells within the package casing. This can allow the battery cells to shift or move when the battery package undergoes vibration or experiences an impact. Such shifting can cause the battery cells to electrically short and/or become damaged. Further, such retrofitting techniques may not firmly fix or hold any electrical component relative to the package casing, thereby increasing the risk of damage to the electrical component when the battery package undergoes vibration or experiences an impact.

Still further, such retrofitting techniques may require that the packaging and filling materials, or glue and support elements, be manually attached to the battery cells. Such manual attachments may provide for non-uniform configurations with respect to the individual battery cells and as to one battery package to the next, as well as increasing the cost of assembling battery packages. Furthermore, retrofitting techniques that use a hot glue or wax to attach battery cells to each other and to one or more support elements increase the risk that the hot glue or wax damages the battery cells or otherwise impairs their integrity. Moreover, certain retrofitting techniques may use an adhesive tape (attached to the bodies of the battery cells) or an insulative sleeve to electrically and mechanically isolate individual battery cells from one another. Such tape layers and insulating sleeves can wear out over time, especially if the battery cells rub together. Applying these tape layers or sleeves to individual battery cells can also be a time consuming process, which can also increase the cost of assembling battery packages. A further disadvantage of such retrofitting techniques is that they may permanently or semi-permanently attach battery cells to each other and/or to other components within the package casing. This reduces the ability of a user to remove and replace a battery cell or other component that is in need of repair or replacement.

In contrast to the aforementioned retrofitting techniques, embodiments of the battery support system 130 described and shown herein can be self-supporting, rigid and/or resilient, and can retain a fixed shape. Embodiments of the battery support system 130 can also accommodate battery cells 120 having various sizes and shapes, allowing such battery cells 120 to be firmly fixed within a package casing 110. For example, the first projections 134 can contact the interior surfaces 116 of the sidewalls 115 of the package casing 110, and the second projections 135 can engage with the side surfaces 123 of the battery cells 120. The first projections 134 can flex and/or absorb shocks, and can also establish clearance spaces between the battery cells 120 and the interior surfaces 116 of the sidewalls 115 of the package casing 110. The second projections 135 can be arranged to establish other clearance spaces between the individual battery cells 120. These clearance spaces can reduce or eliminate the likelihood for vents at the ends 122 of the battery cells 120 or air passageways in the package casing 110 to become partially or completely blocked. Accordingly, the interior region of the package casing 110 can be properly vented while the battery support system 130 provides firm support for the battery cells 120 inside the package casing 110. The battery support system 130 also provides for the electrical contacts of the battery cells to not be blocked.

Another advantage of embodiments of the battery support system 130 is that the two frame members 133 are attached to each other, thereby enhancing the ability of the battery support system 130 to resist flexing (e.g., flexing laterally). A further advantage of embodiments of the battery support system 130 is that the spacer elements 132 can firmly hold an electrical component (such as the circuit board 128 shown in FIG. 1A), thereby reducing the risk of damaging the electrical component when the battery package 100 undergoes vibration or experiences an impact. Furthermore, embodiments of the battery support system 130 allow for forming the entire battery support system 130 in a manufacturing process (e.g., injection molding, casting, etc.), thereby providing for consistency and uniformity of individual components (e.g., the first and second projections 134/135) of an individual battery support system 130 and for consistency and uniformity from one battery support system 130 to the next. Still further, the battery support system 130 can be formed of fire-rated or flame retardant materials. Another advantage of embodiments of the battery support system 130 is that they allow for easy removal and replacement of a battery cell 120 or other component that is in need of repair or replacement.

The second projections 135 can conformably fit around individual battery cells 120 and prohibit the battery cells 120 from shifting out of place (e.g., when undergoing a vibration or impact). Additionally, the second projections 135 can mechanically and/or electrically isolate individual battery cells 120 from one another, reducing or eliminating the need for layers of adhesive tape or insulating sleeves. Furthermore, in some embodiments, the battery support system 130 includes two spacer elements 132, both of which are generally identical to one another (i.e., identical notwithstanding variations due to design and/or manufacturing considerations) and have projections engaged with the sides of the battery cells 120 at opposing ends 122. The use of two spacer elements can further increase the mechanical rigidity of the battery support system. As discussed above, both of the spacer elements 132 can share the same design (as opposed to two complementary, yet differently designed spacer elements), which can reduce manufacturing and inventory costs.

FIG. 1B is a partially cut-away, isometric view of the battery package 100 showing internal features in more detail. The battery package 100 can include conductive connectors 124, a signal wire 126, a contact strip 127, and the circuit board 128. The conductive connectors 124 (e.g., individual nickel strips) can electrically intercouple individual battery cells 120, for example intercoupling individual positive and/or negative terminals at the opposing ends of the battery cells 120 in series and/or parallel configurations. In many embodiments, the conductive connectors 124 can be soldered or spot-welded to individual battery cells 120. The conductive connectors 124 can also be electrically coupled to the signal wire 126, which in turn can electrically couple the battery cells 120 to the circuit board 128. The circuit board 128, for example, can be used for power feedback, safety, and control functionality within the battery package 100 and can be coupled (via additional signal wires, not shown in FIG. 1B) to the contact strip 127. The contact strip 127 can engage with a corresponding contact strip on a portable device, providing power from the battery cells 120 to electronic components (e.g., a circuit board, a microelectronic chip, a wire or related signal path, and/or other types of electronic circuitry) associated with the portable device. In other embodiments that do not include the circuit board 128, the signal wire 126 can directly couple the battery cells 120 to the contact strip 127.

FIG. 1C is an isometric view of an embodiment of the battery support system 130, in which the spacer elements 132 include spring fingers 136 and corresponding locking tabs 138. The spring fingers 136 and tabs 138 can be used to snap around, lock, or otherwise hold the circuit board 128 in a fixed position within the battery package 100. Accordingly, when the battery package 100 is subjected to vibration and/or an impact, the circuit board 128 can be securely held so that it is not damaged and/or shaken loose. In other embodiments, the spring fingers 136 can be replaced with a similar spring-like element and/or the tabs 138 can be replaced with a groove cooperating with the spring fingers 136 or similar spring-like element to perform the same general function of securing the circuit board 128.

As discussed herein, the battery support system 130 can be configured (e.g., by retrofitting) to accommodate different battery sizes. For example, the spacer elements 132 may be positioned closer together to hold battery cells 137b than when holding battery cells 137a, which are longer than battery cells 137b.

Figure 2:
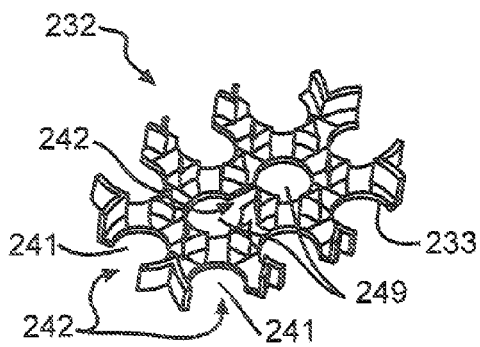
FIG. 2 is a cross-sectional side view of a spacer element having frame openings configured in accordance with another embodiment of the disclosure.

FIG. 1D is a cross-sectional side view of an embodiment of the spacer element 132, showing frame openings 140 formed in a frame member 133. The frame openings 140 can be located between individual projections 134/135, e.g., at portions of the frame member 133 that are flush with electrical contacts of the battery cells 120. Accordingly, the frame openings 140 can facilitate heat conduction away from the battery cells 120 by eliminating material directly adjacent to the electrical contacts of the battery cells 120. The elimination of this material can also prevent the vents at the ends 122 of the battery cells from being blocked. Additionally, the frame openings 140 can also provide avenues through which the conductive connectors 124 can pass to electrically intercouple neighboring battery cells 120. Furthermore, the frame openings 140 can also give the frame member 133 an at least slightly flexible or conformable shape. For example, the frame openings 140 can include individual gaps 142 that allow localized portions of the frame member 133 to flex outwardly away from the center of an individual frame opening 140 so that the inwardly extending projections 135 can conformably fit around at least a portion of the sides of an individual battery cell 120. The conformal fit can also mitigate variations in the diameters of a battery cell 120, which can be on the order of approximately ±0.7 mm. In other embodiments, the frame openings 140 can include additional gaps and/or other configurations of gaps in any of a wide variety of shapes and sizes. For example, the gaps 142 can have the form of notches that do not extend across multiple frame openings, but allow the projections adjacent to the openings to flex. As another example, FIG. 2 illustrates a spacer element 232 that includes a frame member 233 having frame openings 240, 241, and gaps 242 formed at the frame openings 240, 241. The gaps 242 can couple together the neighboring frame openings 240 and/or open the outermost portions of the frame openings 241 so that they are not fully enclosed, surrounded or encircled.

Figure 3:
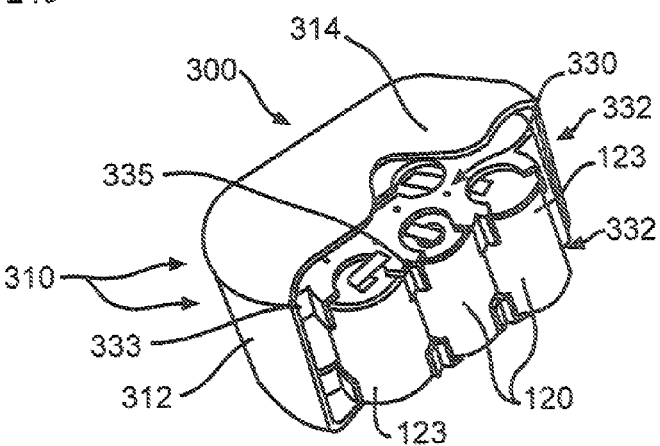
FIG. 3 is a partially cut-away, isometric view of a battery package configured in accordance with yet another embodiment of the disclosure.

Battery support systems in accordance with particular embodiments can be used in package casings that may not need retrofitting. For example, such support systems may not need to account for extra internal volume resulting when smaller battery cells replace larger battery cells. These types of support systems can mechanically and electrically isolate individual battery cells, but in at least some cases, do not include stand-off elements (i.e., projections for accommodating the support system within a package casing). For example, FIG. 3 shows a cut-away, isometric view of an embodiment of a battery package 300 that includes a package casing 310 having a package body 312 and a package end cap 314 that caps a top- or bottom-most portion of the package body 312. The battery package 300 can also include a battery support system 330 that supports and provides clearance for individual battery cells 120 within the package casing 310, but does not provide additional offsets from the interior surfaces of the package casing 310. Accordingly, the battery support system 330 can have spacer elements 332 that include a frame member 333 having inwardly extending projections 335, but no outwardly extending projections, such as the second projections 134 shown in FIGS. 1A-D. The projections 335 can engage with the sides 123 of the battery cells 120 in a manner generally similar to that described above with reference to the inwardly extending first projections 135 shown in FIGS. 1A-D. In this particular example (when the package casing 310 is designed from the outset to house the smaller, more efficient battery cells 120), the spacer elements 332 need not fit tightly into an oversized package casing and accordingly do not include the outwardly extending second projections 134.

Embodiments of battery support systems and related spacer elements can include a variety of suitable materials including molded plastics (e.g., polyvinyl chloride, polyethylene, polymethyl methacrylate and/or other acrylics, silicones, and/or polyurethanes). Battery support systems can also include fire-rated and/or flame retardant materials (e.g., polycarbonates, polycarbonate blends, and polyesters). Embodiments of spacer elements can be made of materials that are suited to meet impact strain requirements, for example by providing shock absorption or flexure for a battery support system. In addition, the spacer elements can include a combination of different materials, such as a metal wire frame member that is insulated with a plastic coating.

Figure 4:
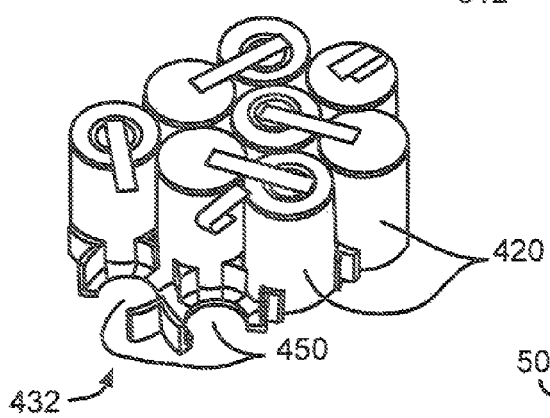
FIG. 4 is an isometric view of a spacer element partially populated with battery cells.

Spacer elements and battery support systems, and packages that include these elements and systems can be assembled using a variety of suitable techniques. In general, individual spacer elements can be engaged with one or more battery cells and then inserted into a package casing. Also, in many embodiments a spacer element or a corresponding battery support system may not be fully populated with battery cells. For example, FIG. 4 is an isometric view of a spacer element 432 that is partially populated with individual battery cells 420. Accordingly, when the spacer element 432 and the battery cells 420 are housed within a corresponding battery package, slots 450 of the spacer element 432 can remain unpopulated. Such an embodiment can provide additional flexibility when designing or retrofitting battery packages, for example by retaining a rigid support structure within a package casing while also allowing a fewer number of batteries to be included with the casing.

Figure 5:
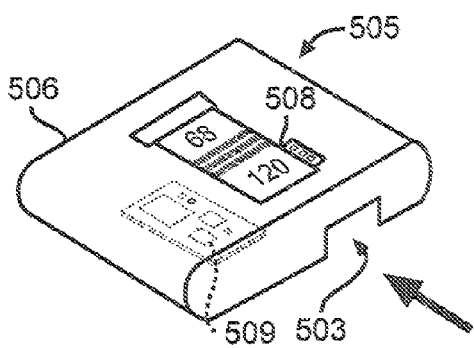
FIG. 5 is an isometric view of a portable device in which battery packages in accordance with embodiments of the disclosure may be carried.

Embodiments of battery packages that include a battery support system can be coupled to a variety of portable electronic devices. For example, FIG. 5 illustrates a portable device 505 having a housing body 506 that includes external electronic components 508 (e.g., an LED display and related controls) accessible from an exterior surface of the housing body 506, and internal electronic components 509 (e.g., a printed circuit board, a microelectronic chip, a wire or related signal path, and/or other types of electronic circuitry) disposed within the housing body 506. The portable device 505 can also include a battery package slot 503. A battery package having any of the foregoing features can be inserted into the slot 503 and electrically coupled to the portable device 505 so as to provide power to the portable device, including power provided to the internal and external electronic components 508 and 509.

FIG. 6 is a partially exploded, isometric view of another embodiment of a battery package 600 that can be operably coupled to a portable device. The battery package 600 can include a package casing, housing or shell 610 having a casing body 612 and a casing lid 614. The package casing 610 encloses a spacer 660 (e.g., a foam spacer), a polyswitch resettable device 650 (e.g., a Raychem PTC, part. no. LR4-450F), two collections of battery cells 620 (shown individually as collections 670a and 670b), a battery support system 630 and a circuit board 628, all of which are arranged longitudinally within the package casing 610. The battery support system 630 includes two spacer elements 632 (shown individually as spacer element 632a, which is interposed between the two collections 670 of the battery cells 620, and spacer element 632b, which is interposed between the collection 670b and a circuit board 628). Each spacer element 632 includes a frame member 633, first projections 634 attached to or carried by the frame 633 and extending in a first direction away from the frame member 633, and second projections 635 attached to or carried by the frame member 633 and extending in a second direction away from the frame member 633 that is opposite the first direction. Similar to the projections 135 depicted in FIGS. 1A-D, the first and second projections 634, 635 of spacer element 632a and the first projections 634 of spacer element 632b can engage with side surfaces 623 of the battery cells 620 proximate to ends 622 of the battery cells 620. The second projections 635 of spacer element 632b can function as stand-offs between the frame member 635 of spacer element 632b and the circuit board 628. As described with reference to, e.g., FIGS. 1D and 2, each spacer element 632 can include openings (not labeled in FIG. 6) in the frame member 633 and gaps (also not labeled in FIG. 6) between openings to facilitate performance of any of the functions previously described. Each spacer element can also include a notch, groove or other feature for engaging with conductive connectors 624, which are attached to or are proximate to the ends 622 of the battery cells 620.

From the foregoing, it will be appreciated that representative embodiments have been described herein for purposes of illustration, but that various modifications may be made to these embodiments, including adding and/or eliminating particular features. For example, the package casings can have characteristics other than those specifically described above, including materials other than plastics (e.g., metals), shapes that are suited to fit within or couple to a particular type of electronic device, and/or interior elements that interface with a spacer element or a battery support system. In other examples, the circuit board within a battery package may be omitted. In many embodiments, a different number of battery cells may be housed in variously sized packages, and in other embodiments the battery cells may include non-rechargeable chemistries. Further, while advantages associated with certain embodiments have been described in the context of those embodiments, other embodiments may also exhibit such advantages, and not all embodiments need necessarily exhibit such advantages. Accordingly, the disclosure can include other embodiments not shown or described above.

I claim:
1. A battery package, comprising:
a casing having an interior surface;

at least one battery cell disposed within the casing, the battery cell having a first end, a second end spaced apart from the first end and a side surface between the first and second ends; and a spacer element disposed within the casing and interposed between the battery cell and the interior surface of the casing, the spacer element including a frame member proximate to the first end of the battery cell, first projections carried by the frame member and extending away from the first end of the battery cell and toward the interior surface of the casing, and second projections carried by the frame member and extending in a generally opposite direction from the first projections and away from the interior surface of the casing, wherein the second projections are engaged with the side surface of the battery cell.

2. The battery package of claim 1 wherein the interior-surface is a first interior surface, the casing further has a second interior surface, the spacer element is a first spacer element, the frame member is a first frame member, and wherein the battery package further comprises:

a second spacer element disposed within the casing and interposed between the battery cell and the second interior surface of the casing, the second spacer element including a second frame member proximate to the second end of the battery cell, third projections carried by the second frame member and extending away from the second end of the battery cell and toward the second interior surface of the casing, and fourth projections carried by the second frame member, extending away from the second interior surface of the casing and engaged with the side surface of the battery cell.

3. The battery package of claim 1 wherein the frame member includes a frame opening between individual first projections.

4. The battery package of claim 3 wherein the frame opening is a first frame opening between a first set of individual first projections, and the frame member further includes:

a second frame opening between a second set of individual first projections; and a gap adjacent to the first and second frame openings, the gap connecting the first and second frame openings within the frame member.

5. The battery package of claim 3 wherein the frame member further includes a gap adjacent to the frame opening, the gap being positioned so that the frame opening is not fully enclosed.

6. The battery package of claim 3, further comprising a conductive connector routed through the frame opening of the frame member and electrically intercoupling at least two battery cells.

7. The battery package of claim 1 wherein the first projections are positioned to provide at least one of shock absorption and flexure for the spacer element.

8. The battery package of claim 1 wherein the frame member includes a finger a tab positioned to hold a circuit board at a fixed position relative to the spacer element.

9. A battery support system for supporting at least one battery cell having spaced apart ends and a side surface between the ends, the battery support system comprising:

a spacer element including a frame member configured to be proximate to an end of the battery cell, the frame member having first having projections extending away from the frame member in a first direction and second projections extending away from the frame member in a direction generally opposite the direction the first projections extend away from the frame member, wherein the first projections are positioned to engage a portion of the side surface of the battery cell.

10. The battery support system of claim 9 wherein the spacer element is a first spacer element, the frame member is a first frame member, the end of the battery cell is a first end of the battery cell, the portion of the side surface of the battery cell is a first portion of the side surface of the battery cell, and wherein the battery support system further comprises a second spacer element icluding a second frame member having third projections extending away from the second frame member, wherein the third projections are positioned to engage a second portion of the side surface of the battery cell.

11. The battery support system of claim 10 wherein the first and second space elements are generally identical.

12. The battery support system of claim 9 wherein the spacer element is intactly removable from the portion of the side surface of he battery cell.

13. The battery support system of claim 9 wherein the battery cell is a first battery cell, and wherein the second projections are configured to engage a portion of a side surface of a second battery cell.

14. The battery support system of claim 9 wherein the frame member includes an opening between at least two projections.

15. The battery support system of claim 14 wherein the opening is a first opening, and wherein the frame member further includes:

a second opening between at least two projections, wherein the second opening is adjecent to the first opening; and a gap coupling the first opening to the second opening.

16. The battery support system of claim 14 wherein the frame member does not fully surround the opening.

17. A method for assembling a battery package, the method comprising:

engaging a side surface of at least one battery cell with a first set of projections extending away from a frame member a spacer element, wherein the projctions in the first set conformably fit around at least at portion of the side surface of the battery cell;

engaging an interior surface of the battery package with a second set of projections extending away from the frame member, wherein the projections in the second set extend in a direction generally opposite the direction the projections in the first set extend away from the frame member, forming an empty space between a terminal end of the battery cell and the interior surface of battery package; and disposing the spacer element and the battery cell within a battery package.

18. The method of claim 17 wherein the frame member is a first frame member, the spacer element is a first spacer element, and wherein the method further comprises engaging a side surface of the battery cell with a third set of projections extending away from a second frame member of a second spacer element, wherein the projections in third set conformably fit around at least a portion of the side surface of the battery cell, and wherein disposing includes disposing the first and second spacer elements and the battery cell within the battery package.

19. A method for retrofitting a battery package, the method comprising:

receiving dimensions for a battery package having an internal volume sized to receive a first set of battery cells having a first length; and based at least in part on the received dimensions, sizing a distance between at least one first spacer element and at least one second spacer element to attach to a second set of battery cells having a second length smaller than the first length, wherein the first spacer element includes a frame member and a set of projections extending away from the frame member and positioned to engage side surfaces of the battery cells in the second set, wherein the second set of battery cells and the attached first spacer element are juxtaposed to be disposed within the internal volume of the battery package.

20. The method of claim 19, further comprising:
attaching the first spacer element to the second set of battery cells; and
disposing the second set of battery cells and the attached first spacer element within the internal volume of the battery package.

21. The method of claim 19 wherein the set of projections is a first set of projections, and wherein the first spacer element further includes a second set of projections extending away from the frame member and configured to engage an interior surface of the battery package.

* * * * *

UNITED STATES PATENT AND TRADEMARK OFFICE
CERTIFICATE OF CORRECTION

PATENT NO. : 8,252,441 B2  
APPLICATION NO. : 12/201636  
DATED : August 28, 2012  
INVENTOR(S) : William A. Planck Page 1 of 1

It is certified that error appears in the above-identified patent and that said Letters Patent is hereby corrected as shown below:

In the Claims:

Column 9, line 5 replace the word "interpoed" with "interposed"

Column 9, line 56 after the word "includes" delete "a finger a tab" and insert --a spring finger and a tab--

Column 10, line 17 replace the word "he" with "the"

Signed and Sealed this  
Fourth Day of June, 2013

Teresa Stanek Rea  
*Acting Director of the United States Patent and Trademark Office*